(12) United States Patent
Jaisinghani

(10) Patent No.: US 7,964,787 B2
(45) Date of Patent: Jun. 21, 2011

(54) HYBRID SOLAR POWER GENERATOR

(76) Inventor: Deepak Jaisinghani, Miramar, FL (US)

( * ) Notice: Subject to any disclaimer, the term of this patent is extended or adjusted under 35 U.S.C. 154(b) by 550 days.

(21) Appl. No.: 12/124,687

(22) Filed: May 21, 2008

(65) Prior Publication Data

US 2009/0288695 A1    Nov. 26, 2009

(51) Int. Cl.
*H01L 31/058* (2006.01)
*B60K 16/00* (2006.01)
(52) U.S. Cl. .............. 136/248; 136/244; 60/641.8
(58) Field of Classification Search .......... 136/244–265, 136/291
See application file for complete search history.

(56) References Cited

U.S. PATENT DOCUMENTS

| | | | | |
|---|---|---|---|---|
| 2,942,411 A * | 6/1960 | Hutchings | ............. | 60/641.8 |
| 4,079,591 A * | 3/1978 | Derby et al. | ............. | 60/641.8 |
| 4,273,102 A * | 6/1981 | Anthony | ............. | 126/591 |
| 4,718,233 A * | 1/1988 | Barrett | ............. | 60/496 |
| 4,841,731 A * | 6/1989 | Tindell | ............. | 60/641.8 |
| 5,005,360 A * | 4/1991 | McMurtry | ............. | 60/659 |
| 5,419,135 A * | 5/1995 | Wiggs | ............. | 60/641.15 |
| 6,957,536 B2 * | 10/2005 | Litwin et al. | ............. | 60/641.8 |
| 6,981,377 B2 * | 1/2006 | Vaynberg et al. | ............. | 60/641.8 |
| 7,340,899 B1 * | 3/2008 | Rubak et al. | ............. | 60/641.8 |

FOREIGN PATENT DOCUMENTS

| | | | |
|---|---|---|---|
| CN | 101059293 A | * | 10/2007 |
| DE | 102005053857 A1 | * | 5/2007 |
| JP | 2006029668 A | * | 2/2006 |
| JP | 2007085685 A | * | 4/2007 |

* cited by examiner

*Primary Examiner* — Jessica L Ward
*Assistant Examiner* — Kevin E Yoon
(74) *Attorney, Agent, or Firm* — Michael I. Kroll

(57) ABSTRACT

A hybrid means for producing and storing power derived from a photovoltaic source through pneumatic, mechanical and chemical means utilizing pressure tanks, air turbines and batteries. To regulate the device a plurality of control and routing devices are utilized to redistribute additional energy to an appropriate chemical or pressurized means for storing potential energy for later use.

21 Claims, 8 Drawing Sheets

HYBRID SOLAR POWER GENERATOR

BACKGROUND OF THE INVENTION

1. Field of the Invention

Figure 1:
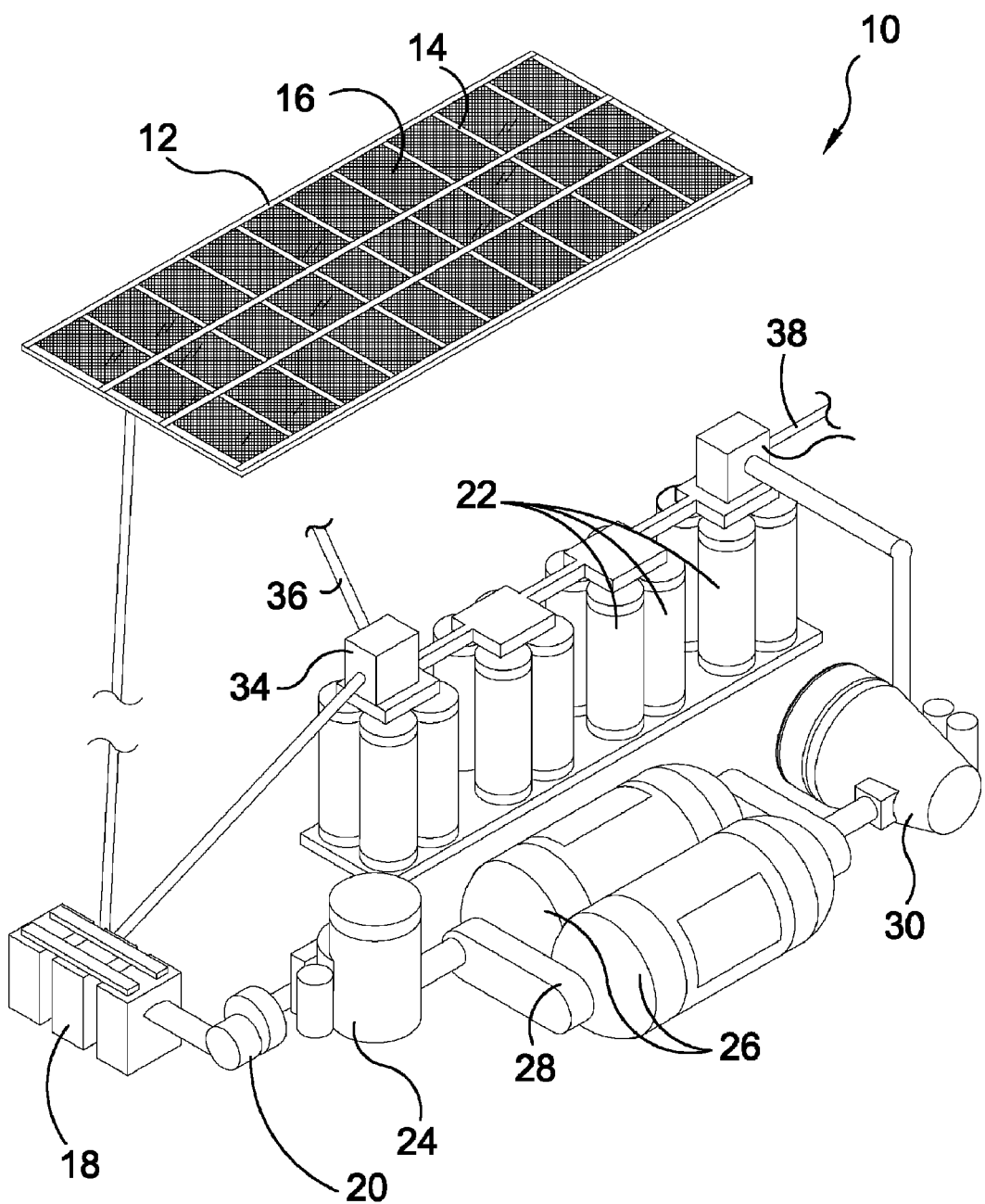

The present invention relates generally to power and, more specifically, to a solar energy management system having photovoltaic panels that continuously produce power to be converted and stored through a sequence and plurality of mediums including chemical and physical storage means.

The present invention feeds power derived from a photovoltaic source into a plurality of batteries whereupon an energy switch determines either direct or stored current to run a compressor that operates to build pneumatic pressure within a plurality of storage tanks, which are then directed through an air turbine, where then the produced power is stored into a plurality of large storage batteries. The power is distributed appropriately back into the system or utilized outside the system.

The hybrid solar power generator of the present invention is fully automated and self managing due to a plurality of switches and automatic controls that decide the best distribution and storage of potential power throughout the system, with the primary intention of storing the maximum potential physical and chemical potential for use when called upon by an outside requirement.

2. Description of the Prior Art

There are other systems designed for solar power generation. Typical of these is U.S. Pat. No. 2,942,411 issued to Hutchings on Jun. 28, 1960.

Another patent was issued to Derby et al. on Mar. 21, 1978 as U.S. Pat. No. 4,079,591. Yet another U.S. Pat. No. 4,273,102 was issued to Anthony on Jun. 16, 1981 and still yet another was issued on Apr. 9, 1991 to McMurtry as U.S. Pat. No. 5,005,360.

Another patent was issued to Wiggs on May 30, 1995 as U.S. Pat. No. 5,419,135. Yet another U.S. Pat. No. 6,957,536 was issued to Litwin et al. on Oct. 25, 2005. Another was issued to Vaynberg et al. on Jan. 3, 2006 as U.S. Pat. No. 6,981,377 and still yet another was issued on Mar. 11, 2008 to Rubak et al. as U.S. Pat. No. 7,340,899.

Japan Publication No. JP2006029668 was published on Feb. 2, 2006 to Masahisa. Yet another Japanese Publication No. JP2007085685 to Satoshi was published on Apr. 5, 2007. A German Publication No. DE102005053857 was published on May 16, 2007 to Volker and still yet another was published on Oct. 24, 2007 to Lan as Chinese Publication No. CN101059293.

U.S. Pat. No. 2,942,411

Inventor: Le Roi E. Hutchings

Issued: Jun. 28, 1960

A power generating assembly for the continuous generation of mechanical energy from solar energy which consists of a solar energy conversion system comprising a solar boiler having a feedwater inlet and a steam outlet to gather energy from the sun and apply said energy to convert water into steam at an elevated temperature and pressure, a prime mover and means for transferring said steam to said prime mover, a condenser to condense the exhaust steam of said prime mover and means for transferring said exhaust steam from said prime mover to said condenser, a hot-water reservoir, a cold-water reservoir, means connecting said condenser, hot-water reservoir, and cold-water reservoir serially in the order stated, for the passage of water therethrough, and means for transferring condensate from said condenser to said hot-water reservoir; and a compressor system including a nonliquefiable gas, a compressor means driven by said prime mover for compressing said gas, a heat exchanger, a high-pressure storage reservoir for said gas, a gas motor, a low-pressure storage reservoir for said gas, said compressor means, heat exchanger, high-pressure reservoir, motor, and low-pressure reservoir being serially connected in the order stated for the passage of said gas through said compressor system; said heat exchanger also being connected between the feedwater inlet to said solar boiler and said cold-water reservoir for the passage of water from said cold-water reservoir through said heat exchanger to said boiler, so that gas leaving said compressor means is cooled and the boiler feedwater is heated, and means for transferring water from said hot-water reservoir to said gas motor and from said gas motor to said cold-water reservoir, said water giving up heat in said gas motor to achieve substantially isothermal operation of said gas motor; and said high-pressure reservoir having capacity sufficient to operate said gas motor during extended periods of insufficient solar energy.

U.S. Pat. No. 4,079,591

Inventor: Ronald C. Derby et al

Issued: Mar. 21, 1978

The specification discloses a Solar Power Plant which utilizes a sun-tracking parabolic collector and a plurality of energy storage and conversion devices, all of which are operated under the control of a novel energy management system. Allocation of energy to a particular storage component or to useful output is dependent upon the state of the system as well as the nature of the demand. Outputted energy may also be recaptured and reallocated to minimize losses. Efficiency at the component level is enhanced by the utilization of novel heat exchangers which effectuate complete conversion of the operating liquid to superheated gas.

U.S. Pat. No. 4,273,102

Inventor: Myron L. Anthony

Issued: Jun. 16, 1981

A solar energy system employing high-pressure high velocity air as the primary heat transfer medium comprises a plurality of collector panels connected in parallel with each other in a closed loop that also includes an air compressor and a heat exchanger that is connected to external energy utilization means. A self-actuating temperature-responsive air flow control valve associated with each collector panel cuts off the air flow through the panel whenever the air temperature in the panel is below a minimum threshold value and allows an increasing air flow through the panel up to a maximum as the temperature increases, maintaining the output temperature from the collector panel essentially constant for widely varying conditions of solar radiation. An air feedback circuit connects the outlet of the compressor to its inlet, bypassing the collector panels, and includes a pressure-responsive feedback control valve to assure a relatively constant total flow through the compressor. In some of the system embodiments, a thermal store is incorporated in the closed loop. A preferred construction employs a thermal feedback comprising an air/air heat exchanger connected from the outlet of the compressor to its inlet. The preferred collector panel construction utilizes a metal foil radiation absorber/air heater mounted in housing having an insulated base with the front of the housing closed by a cover formed of a thin sheet of glazing material affording a multiplicity of corrugations of generally sinusoidal configuration extending longitudinally of the housing and a manifold at each end of the housing.

U.S. Pat. No. 5,005,360

Inventor: J. A. McMurtry

Issued: Apr. 9, 1991

A solar energy system for generating electricity. The system tracks the sun during the day to produce a concentrated beam of light which is focused through a fixed opening in a heat storage chamber. The beam of light pressurizes the chamber and seals the fixed opening to prevent depressurization of the chamber. A closed circuit fluid heat transfer system collects heat from the heat storage chamber and powers a turbine. Heat powers the closed circuit system. A pump is not used in the closed circuit system. The turbine powers an electrical generator.

U.S. Pat. No. 5,419,135

Inventor: B. Ryland Wiggs

Issued: May 30, 1995

A power generation system for use in outer space includes a radiation receiver disposed for receiving energy from solar, stellar or planetary heat radiation. The radiation receiver includes at least two evaporator cells. Each of the evaporator cells has an inlet, an outlet, a passageway for a refrigerant, and is constructed of a heat absorptive and conductive material. Energy from the solar, stellar or planetary radiation is absorbed by the radiation received and transferred to the refrigerant for changing the refrigerant from a liquid to a gas. The refrigerant gas is directed to a turbine or other engine wherein the gas is expanded and energy is released in the form of rotation of a shaft. The turbine shaft may be coupled to a generator for converting the mechanical rotational energy to electrical power, or to a hydraulic or pneumatic pressure device arranged to store power by compression of a fluid or a gas. The refrigerant gas discharged from the turbine is cooled/condensed in a condenser disposed in an area shaded from the solar radiation, and directed toward a heat sink such as a cooler planet or toward deep space. The refrigerant liquid is recirculated to the radiation receiver, and the process is performed continuously. In an alternative embodiment, a pair of refrigerant loops are thermally coupled via a heat transfer apparatus. One of the loops includes a compressor which enables continuous system operation under all temperature conditions.

U.S. Pat. No. 6,957,536

Inventor: Robert Z. Litwin et al

Issued: Oct. 25, 2005

Systems and methods capable of producing electrical power from solar energy through the use of air cycles without fossil fuel combustion. The system includes a solar receiver, a generator, a compressor, and an expander. The expander is coupled to the generator to drive the generator and coupled to the compressor to drive the compressor. The system uses solar generated heat from the solar receiver to heat compressed air from the compressor. The solar generated heat can be directly transferred from the solar receiver to the compressed air as the compressed air flows through receiver tubes of the solar receiver, or the solar receiver can transfer the solar generated heat to a liquid metal, with the liquid metal transferring thermal energy to the compressed air. The expander receives and expands the heated compressed air to drive the generator to produce electricity, and to drive the compressor to compress air.

U.S. Pat. No. 6,981,377

Inventor: Mlkhall Vaynberg

Issued: Jan. 3, 2006

Recovery of electric power from low-grade waste heat/solar energy, comprising a closed-cycle charged refrigerant loop. Pressurized refrigerant fluid is pumped at ambient temperature through a heat exchanger connected to a waste heat/solar source to extract heat energy during conversion to a high pressure gas. Heated/pressurized refrigerant gas is inlet into an expander to power an output shaft during the expansion of the fluid to a cooled gas at approximately 0 psig. Cooled gaseous refrigerant is condensed to a liquid at low pressure and ambient temperature, and recycled under pressure to the heat exchanger. The expander is a reverse-plumbed gas compressor; the pressurized, hot refrigerant gas is inlet at what is ordinarily its outlet, and the normal inlet becomes the expander end. The refrigerant gas mass flow pressure/temperature drop spins the expander shaft for direct mechanical power take-off, or coupling to a synchronous or inductive generator to produce electricity.

U.S. Pat. No. 7,340,899

Inventor: Jeffrey Rubak et al

Issued: Mar. 11, 2008

An economical solar generator system is provided wherein the solar energy collector is constructed from a plurality of heat exchangers of the kind used as evaporators in automobile air conditioners. The solar generator system includes a plurality of said heat exchangers connected to receive incoming liquefied refrigerant under pressure. The number of such heat exchangers is sufficient to collect solar energy sufficient to induce a phase change from a liquid to a gas state. The solar generator system also includes an air motor and an electric generator. The air motor is coupled to the outflow heated gas from the plurality of heat exchangers. The air motor is rotated by the heated gas. The electrical generator is coupled to the air motor so that rotation of said air motor causes rotation of said generator.

Japan Publication Number JP2006029668

Inventor: Otake Masahisa et al

Published: Feb. 2, 2006

PROBLEM TO BE SOLVED: To provide a solar power generation system capable of efficiently melting snow accumulated on a solar panel.

SOLUTION: This solar power generation system is constituted by connecting the solar panel 20 for photovoltaic power generation, an electric compressor 12, a radiator 13 composed of a first heat exchanger 14 and a second heat exchanger 15, a capillary tube 16 as a pressure reducing device, and an evaporator 17 sequentially and annularly by pipes. This system is provided with a refrigerant circuit 10 constituted by circulating carbon dioxide refrigerant and a brine circulation circuit 30 for circulating brine by a pump 37. Heat from the second heat exchanger 15 of the radiator 13 in the refrigerant circuit 10 is conveyed to the solar panel 20 by the brine circulation circuit 30.

Japan Publication Number JP2007085685

Inventor: Iue Satoshi

Published: Apr. 5, 2007

PROBLEM TO BE SOLVED: To provide a CO2 cycle driving device using solar power generation solving a further problem of environmental destruction, usable without trouble even in an area with an unstable electric power situation, and capable of efficiently utilizing energy.
SOLUTION: The CO2 cycle driving device using solar power generation comprises a refrigerant circuit formed by annularly connecting a compressor 10, a gas cooler 154, an expansion valve 156, an evaporator 157, and the like, using carbon dioxide as a refrigerant, and allowing the high pressure side to have supercritical pressure; a solar battery SD; and a water storage tank 176. Electric power generated in the solar battery SD is applied to an electric element 14 to carry out operation. The water storage tank 176 is divided to a warm water chamber 177 and a cold water chamber 178. Water in the warm water chamber 177 is heated by the gas cooler 154, and water in the cold water chamber 178 is cooled by the evaporator 157.

Germany Publication Number DE102005053857

Inventor: Carlguth Volker et al

Published: May 16, 2007

The system has a piston compressor (1) that presses air that is compressed in an absorber pipe (2) of a parabolic channel (3) with high pressure. The air is heated and expanded by solar radiation in a valve-controlled piston engine (4). The engine is connected with the compressor by a form-fitting connection (6) to drive the compressor. The piston engine is provided in a lower dead center after the expansion of the air, where a part of the mechanical energy of the engine is utilized by the form-fitting connection for driving the compressor.

China Patent Number CN101059293

Inventor: Xia Chaofeng Lan

Published: Oct. 24, 2007

The present invention relates to a round platform solar energy heat pump system which belongs to energy utilizing technology. The present invention consists of auxiliary device (14), water tank (13) installed in the auxiliary device (14), water condenser (12) installed in the water tank (13), fluid-storing tank (2) connected with the outlet of auxiliary device (14), heat emission actuating medium stack pipe (3) connected with the fluid-storing tank (2), dry filter (4) connected with the heat emission actuating medium stack pipe (3), compressor (6) connected with pressure gage (5), thermoregulator (7) installed on compressor (6) connecting pipelines, expansion valve (9) installed between the pressure gage (8) and (10), pressure gage (5), (8) and (10) separately installed on connecting pipelines and hot water exhaust pipes (11) connected with water tank. The invention has advantages of high solar energy heat-collecting rate, small accommodation area and organic combination with constructions, it can be used in solar energy utilization field widely.

While these power systems may be suitable for the purposes for which they were designed, they would not be as suitable for the purposes of the present invention, as hereinafter described.

SUMMARY OF THE PRESENT INVENTION

A primary object of the present invention is to provide a power generation system using solar derived energy to store electric potential among a plurality of chemical and physical means for later use.

Another object of the present invention is to provide a power generation system wherein the stored compressed air is used to power the turbines during non-solar periods.

Yet another object of the present invention is to provide a power generation system comprising solar panels to generate energy that is stored and utilized to run a compressor that in turn drives an air turbine utilized to charge and store power in a larger battery bank for later use.

Another object of the present invention is to provide a power generation system having energy control and routing components to direct power to the appropriate devices in order to store the maximum amount of power the present invention can be charged with.

Yet another object of the present invention is to provide a power generation system that can be integrated into existing power systems as a back up or supplementary source.

Additional objects of the present invention will appear as the description proceeds.

The present invention overcomes the shortcomings of the prior art by providing a hybrid means for producing and storing power derived from a photovoltaic source through pneumatic, mechanical and chemical means utilizing pressure tanks, air turbines and batteries. To regulate the device a plurality of control and routing devices are utilized to redistribute additional energy to an appropriate chemical or pressurized means for storing potential energy for later use. Additionally the present invention can be utilized in remote locations as a primary or supplementary power source.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
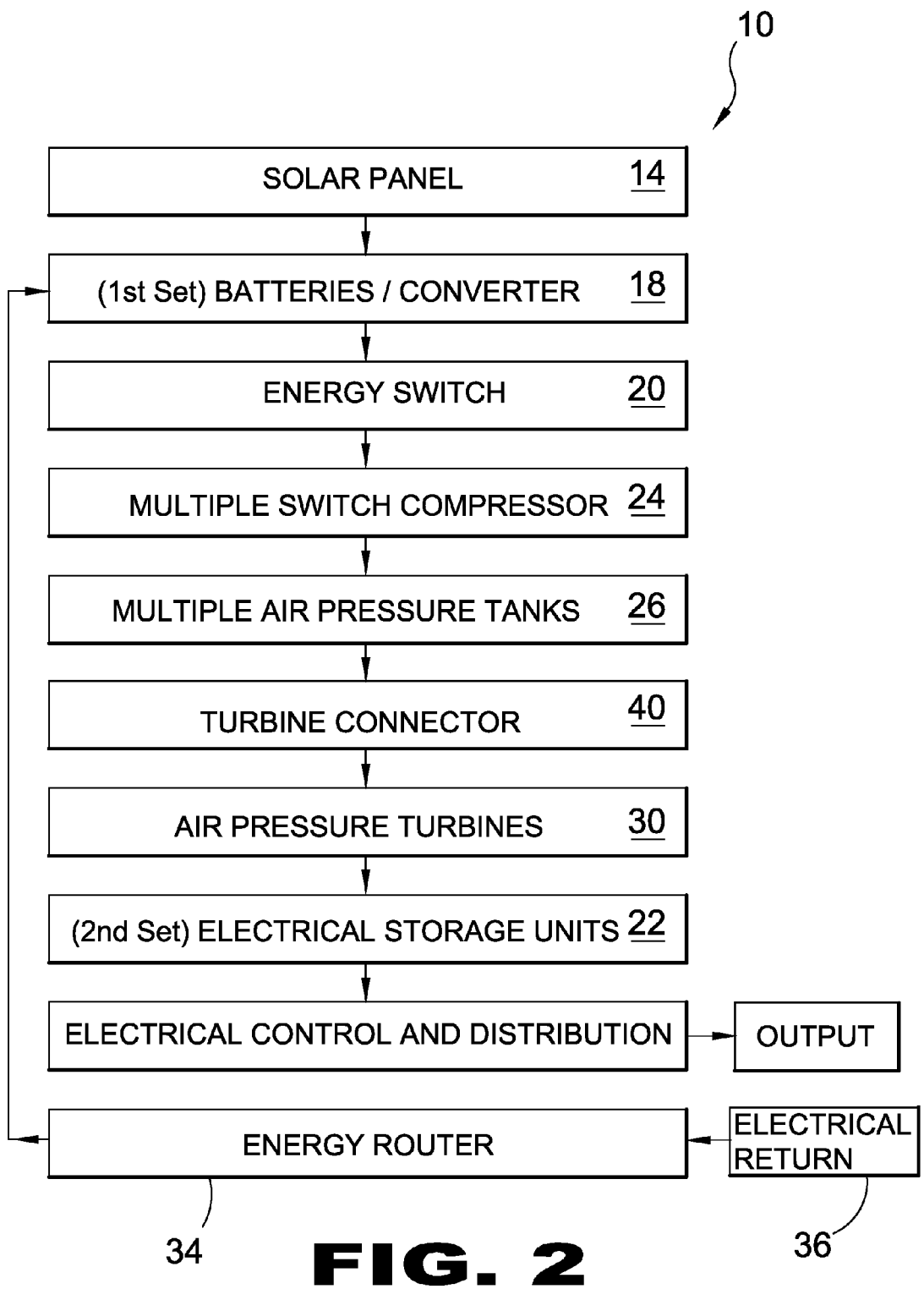
Figure 3:
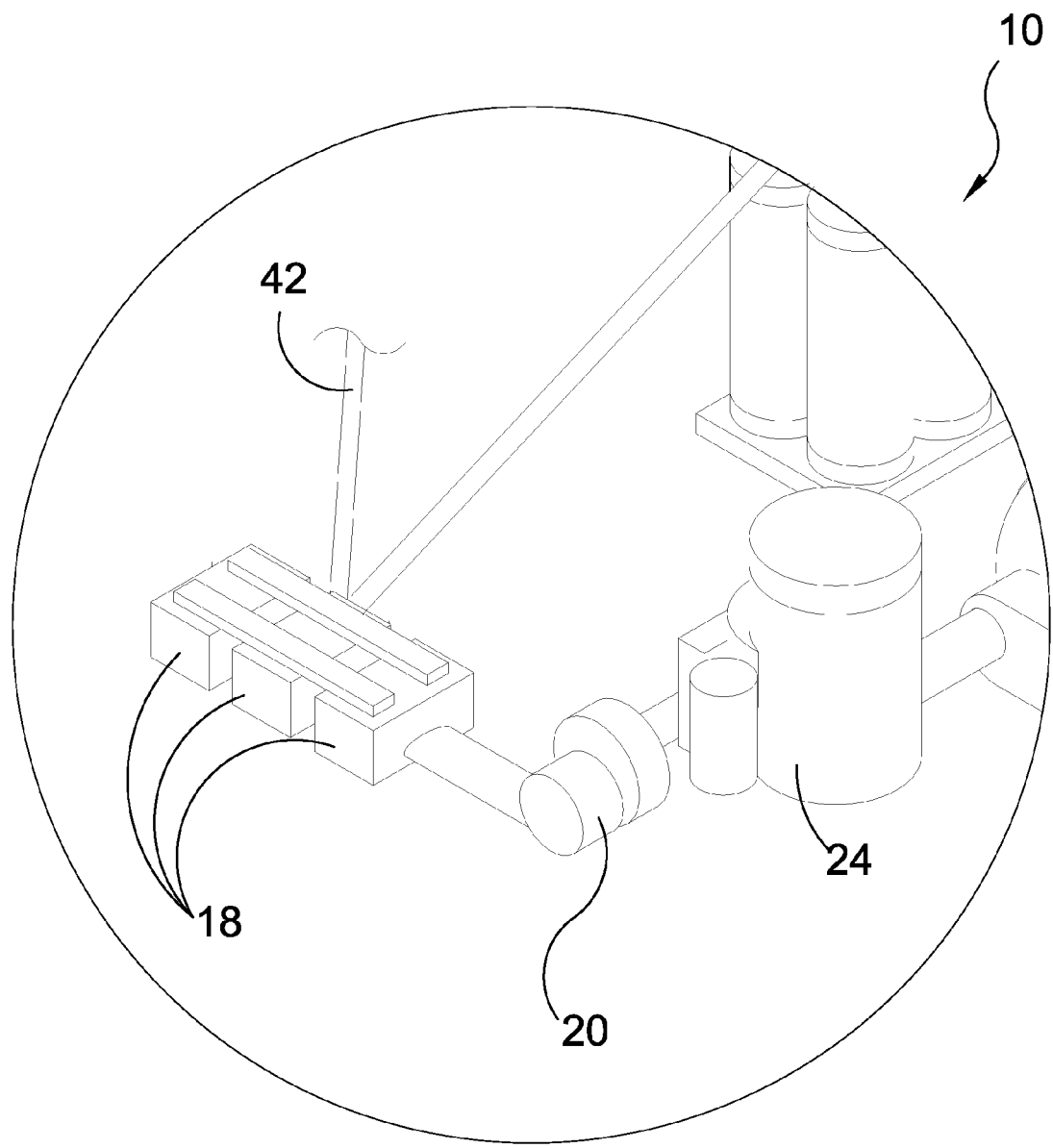
Figure 4:
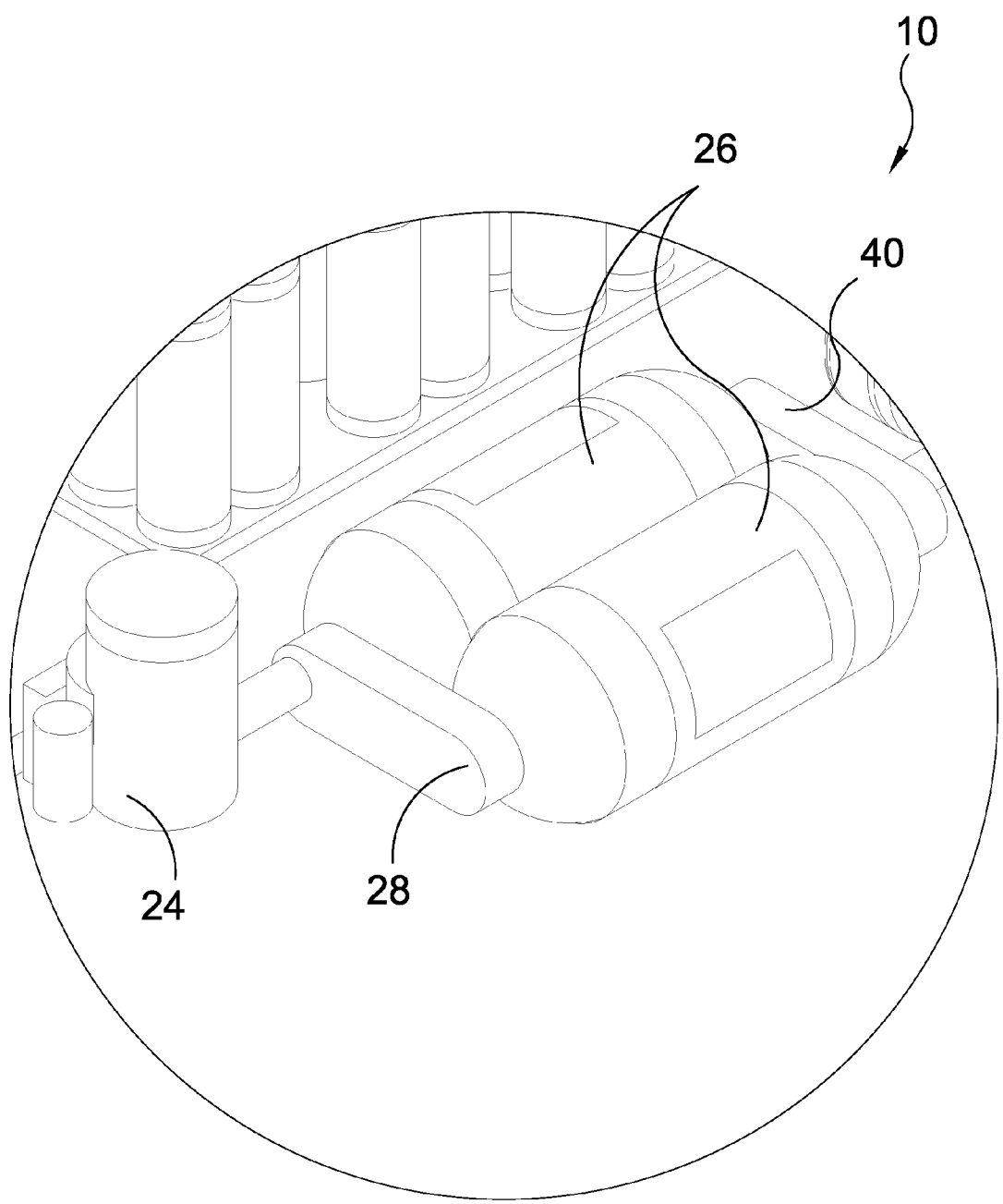
Figure 5:
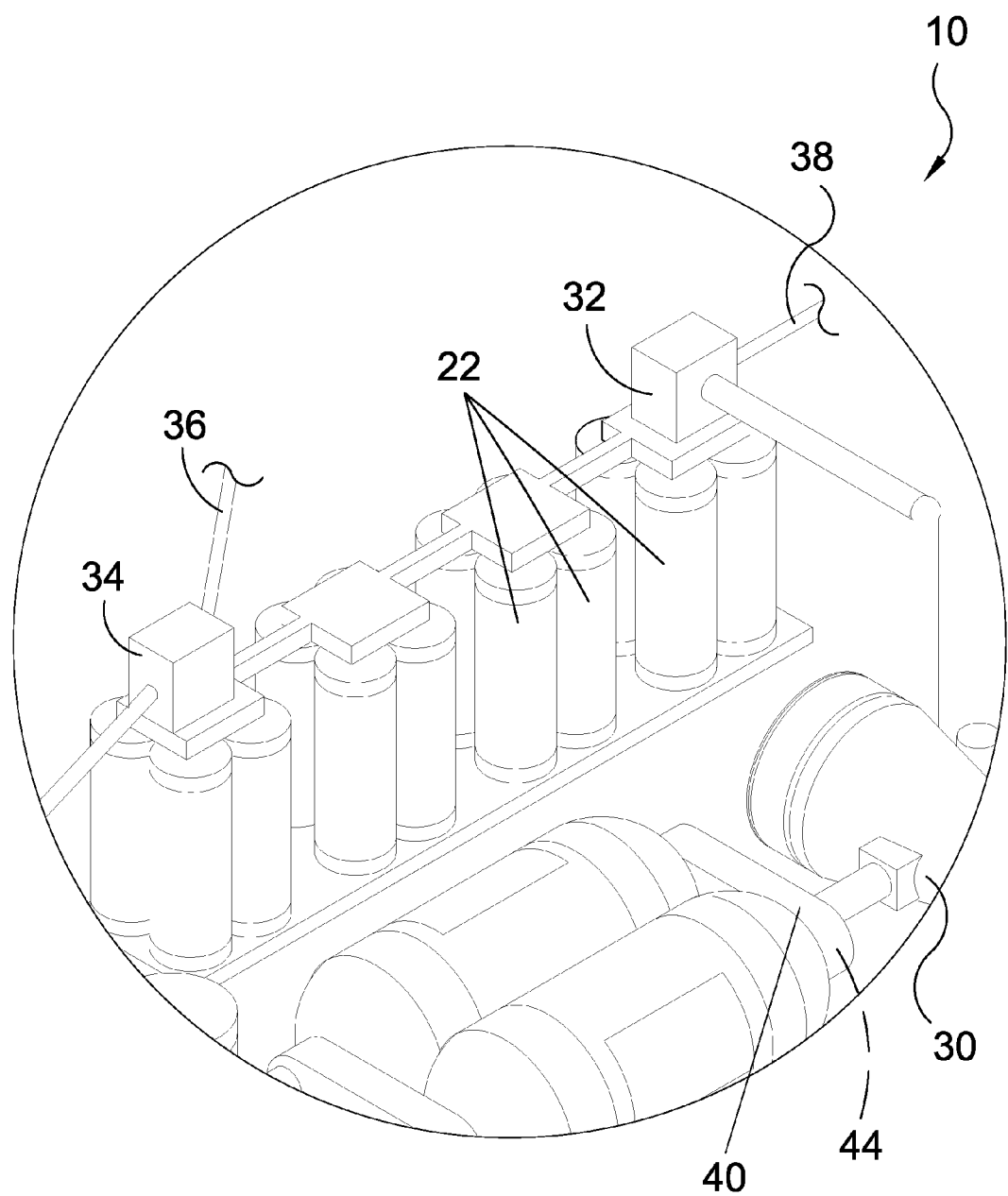
Figure 6:
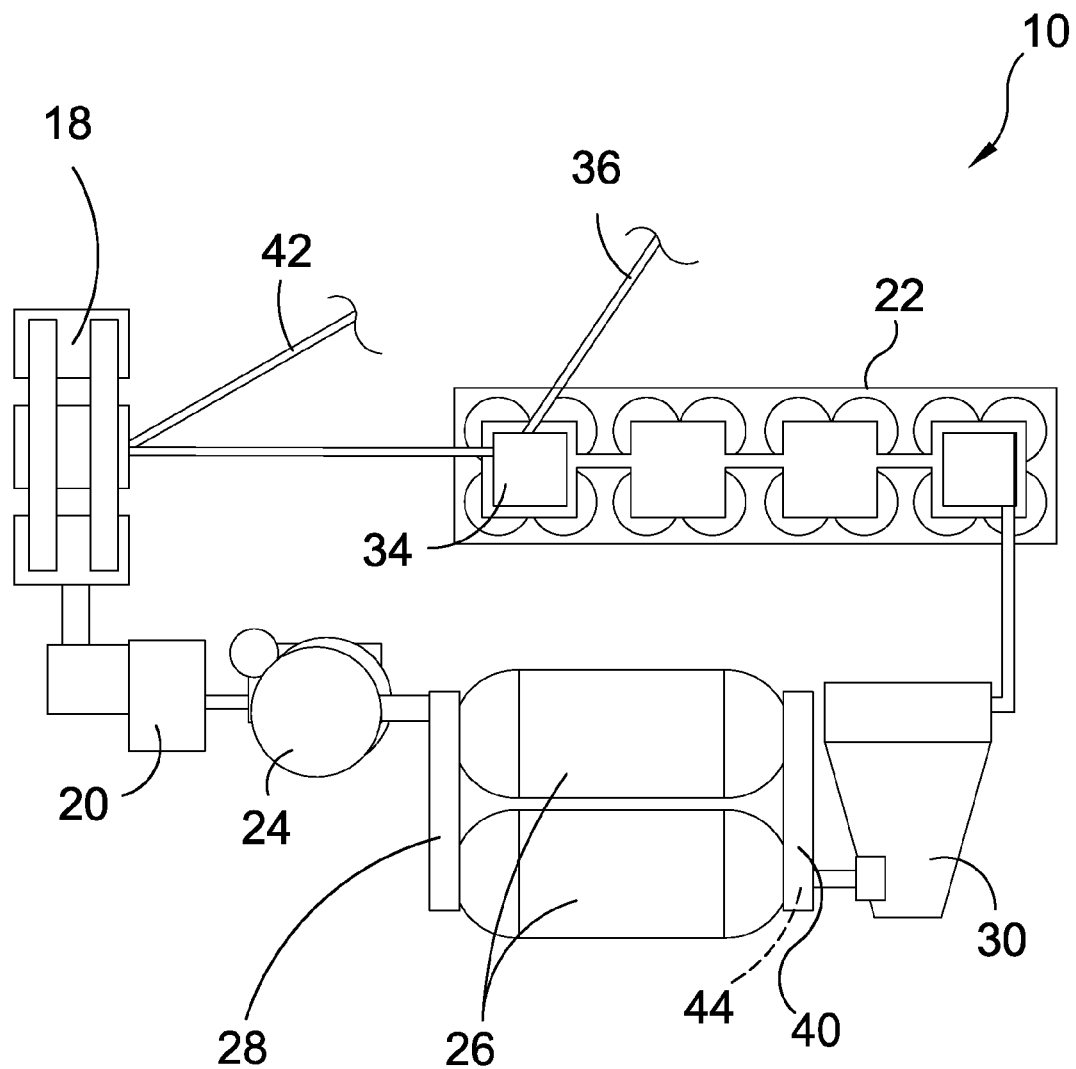
Figure 7:
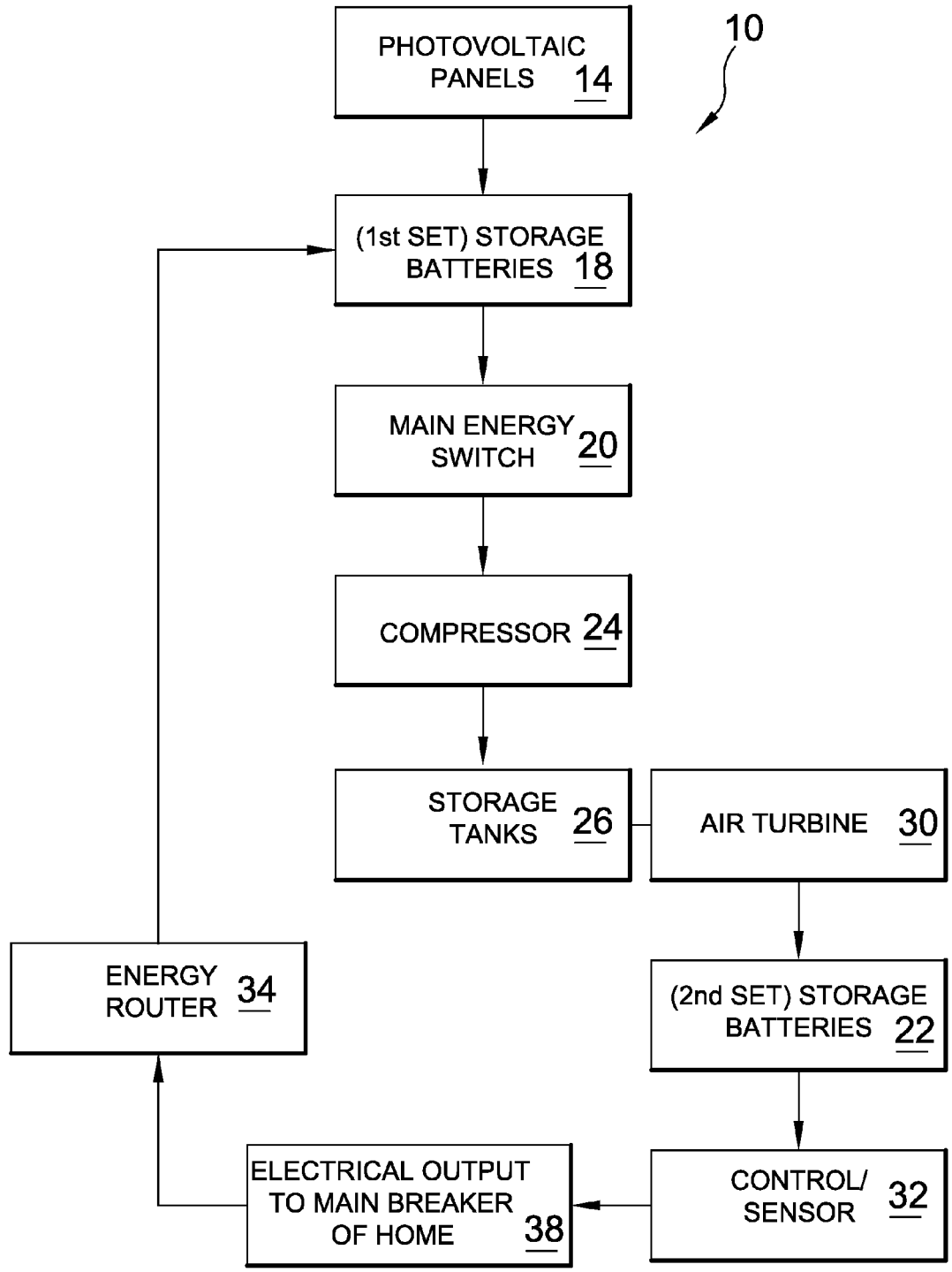
Figure 8:
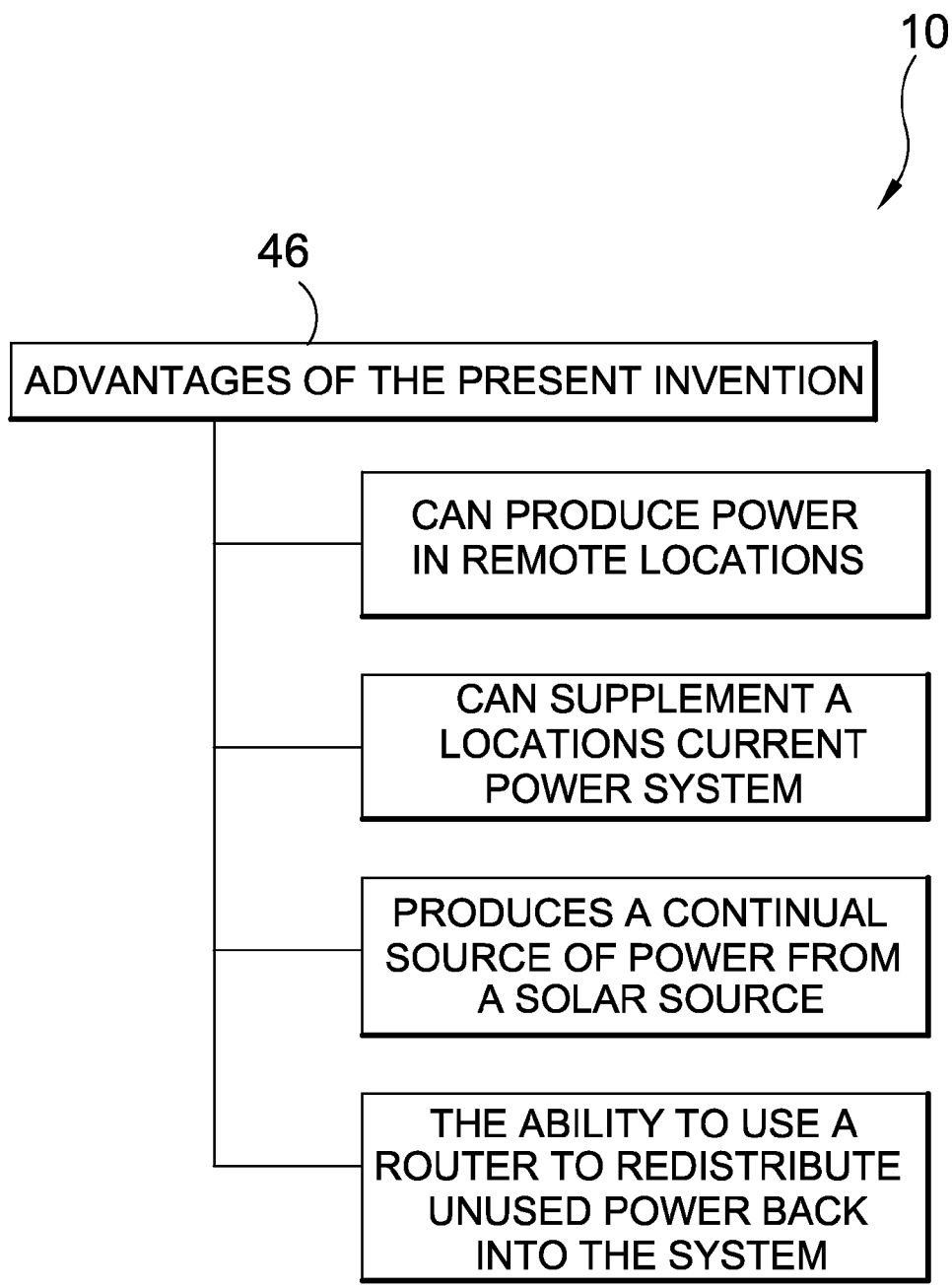

In order that the invention may be more fully understood, it will now be described, by way of example, with reference to the accompanying drawing in which:

FIG. 1 is an illustrative view of the present invention.
FIG. 2 is a flow chart of the present invention.
FIG. 3 is an illustrative view of the present invention.
FIG. 4 is an illustrative view of the present invention.
FIG. 5 is an illustrative view of the present invention.
FIG. 6 is a top view of the present invention.
FIG. 7 is a diagram of the present invention.
FIG. 8 is a diagram of the present invention.

DESCRIPTION OF THE REFERENCED NUMERALS

Turning now descriptively to the drawings, in which similar reference characters denote similar elements throughout the several views, the Figures illustrate the method of constructing a catalog of the resources accessible through a network of the present invention. With regard to the reference numerals used, the following numbering is used throughout the various drawing figures.

10 Hybrid Solar Power Generator
12 solar array
14 photovoltaic panel
16 photovoltaic cell
18 first battery bank
20 main energy switch
22 second battery bank
24 air compressor
26 air storage tank
28 first control sensor
30 turbine
32 second control sensor
34 energy router
36 electrical return
38 electrical outlet
40 turbine connector
42 photovoltaic cable
44 release sensor
46 advantages of the present invention

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10. Shown is the present invention being a hybrid solar power generator 10 that functions to store produced electricity utilizing a plurality of cooperating pneumatic, mechanical and chemical mediums such as pressure tanks, turbines and batteries. The present invention allows for the user to produce and store ample amounts of power continuously produced from the photovoltaic panels 14 for immediate or later use. Additionally the present invention 10 begins functioning with fully charged batteries and pressure sources that are regulated and recharged in accordance to commands regulated and given by a main energy switch 20. A solar array 12 comprising a plurality of photovoltaic panels 14, each having a plurality of photovoltaic cells 16 harvests solar energy and delivers it to a first battery bank 18. The main energy switch 20 is in line after the first battery bank 18 and determines when the system is at maximum capacity, at that time it can choose to disconnect the solar array 12 or charge a second battery bank 22. The electricity from the first battery bank 18 powers an air compressor 24 to fill storage tanks 26 until being cut off by a first control sensor 28 upon reaching capacity. The compressed air in the storage tanks 26 selectively activates an air turbine 30 to convert the potential stored energy into mechanical energy which is diverted accordingly by a second control sensor 32 to provide electrical output 38 to the main breaker or to the second battery bank 22. An energy router 34 and electrical return 36 are also provided.

FIG. 2 is a flow chart of the present invention 10. Shown are the components and operations taken by the present invention while operating to continuously produce and store power from the photovoltaic panels 12 including the first battery bank 18, the main energy switch 20, the multiple switch air compressor 24, multiple air pressure storage tanks 26, a turbine connector 40, air pressure turbines 30, a second battery bank electrical storage unit 22, am electrical return 36 and an energy router 34.

FIG. 3 is an illustrative view of the present invention 10. Shown is the hybrid solar power generator 10 wherein initially harnessed power is transferred through a photovoltaic cable 42 to the first battery bank 18 to provide immediate power storage. Additionally a main energy switch 20 is provided for regulating power from both the batteries 18 and photovoltaic cells to an air compressor 24 utilized for producing and storing mechanical potential.

FIG. 4 is an illustrative view of the present invention 10. Shown is the hybrid solar power generator 10 wherein air pressure produced by the compressor 24 is introduced through a first control sensor 28 to a plurality of large storage tanks 26 and stored for later use and reconversion into electrical energy utilizing a pneumatically driven air turbine through the turbine connector 40. The storage tanks 26 will be pressurized to maximum capacity during original installation.

FIG. 5 is an illustrative view of the present invention 10. Shown is the present invention 10 having an air driven turbine 30 for reconversion of the stored pressure into electrical power whereby it can then be stored in the second battery banks 22 that are regulated and distributed via the second control/sensor unit 32, energy router 34, electrical return 36 and electrical output 38 to the main breaker box. The turbine connector 40 has a release sensor 44 for pressure into the air turbine 30.

FIG. 6 is a top view of the present invention 10. Shown is a top view of the present invention 10 having a solar power source that is continuously producing electricity to feed and store either chemical electrical potential into battery banks 18, 22 or physical potential energy inside of air pressure storage tanks 26. The solar energy is transferred through the photovoltaic cable 42 to the first set of battery banks 18 which powers an air compressor 24 according to the main energy switch 20 to fill the storage tanks 26. The first control sensor 28 determines the pressure in the storage tanks 26 thereby allowing increased or decreased air therein. A turbine connector 40 has a release sensor 44 for regulating the pressure into the air turbine 30 to charge the second battery bank 22. Power from the second battery bank 22 is distributed through the energy router 34 and electrical return 36.

FIG. 7 is a diagram of the present invention 10. Shown is a diagram of the present invention 10 and the components responsible for storing and producing energy. Additionally shown is the means and distribution of power being transferred between the various components. Shown are the photovoltaic panels 14, the first battery bank 18, the main energy switch 20, the compressor 24, the air storage tanks 26, the air turbine 30, the second battery bank 22, the second control sensor 32, the electrical output 38 to the main breaker and the energy router 34.

FIG. 8 is a diagram of the present invention 10. Shown is a diagram of the advantages 46 provided by the present invention 10 including producing power in remote locations, supplementing existing power systems, producing a continual source of power from solar energy and the ability to utilize a router to redistribute unused power back into the system.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A hybrid solar power generator comprising:
   a) a photovoltaic cell for converting light energy to electrical energy;
   b) a first battery electrically connected to receive and store electrical energy from said photovoltaic cell;
   c) a main energy switch electrically connected to said first battery, said main energy switch capable of disconnecting said photovoltaic cell when said hybrid solar power generator is at maximum capacity;
   d) an air compressor for converting electrical energy from said first battery to mechanical energy, said air compressor electrically connected to said main energy switch;
   e) a compressed air storage tank connected to said air compressor for storing the mechanical energy produced by said air compressor as potential energy in the form of compressed air;
   f) a first control sensor for determining if said compressed air storage tank is filled to capacity and deactivating said air compressor to prevent overfilling said compressed air storage tank;
   g) an air turbine connected to said compressed air storage tank for converting the potential energy stored as compressed air to mechanical energy and electrical energy;
   h) a second control sensor connected to said air turbine for selectively sending electrical energy to a second battery or to an electrical outlet;
   i) the second battery electrically connected to said second control sensor for storing electrical energy;
   j) the electrical output electrically connected to said second control sensor for sending electrical energy out of the system for use;
   k) an energy router for directing electrical energy from said second battery; and
   l) an electrical return for transmitting electrical energy from said second battery according to direction from said energy router.

2. A hybrid solar power generator according to claim 1, wherein said photovoltaic cell is one of a plurality of photovoltaic cells connected within a photovoltaic panel.

3. A hybrid solar power generator according to claim 2, wherein said photovoltaic panel is one of a plurality of photovoltaic panels connected within a solar array.

4. A hybrid solar power generator according to claim 3, wherein said first battery is one of a plurality of batteries connected within a first battery bank.

5. A hybrid solar power generator according to claim 4, wherein said second battery is one of a plurality of batteries connected within a second battery bank.

6. A hybrid solar power generator according to claim 5, wherein said compressed air storage tank is one of a plurality of interconnected compressed air storage tanks.

7. A hybrid solar power generator according to claim 6, wherein said electrical return is an electrical connection between said second battery bank and said first battery bank, by way of said energy router.

8. A hybrid solar power generator according to claim 7, wherein said main energy switch is capable of directing electrical energy from said first battery bank to said second battery bank.

9. A hybrid solar power generator according to claim 3, wherein said second battery is one of a plurality of batteries connected within a second battery bank.

10. A hybrid solar power generator according to claim 3, wherein said compressed air storage tank is one of a plurality of interconnected compressed air storage tanks.

11. A hybrid solar power generator according to claim 3, wherein said electrical return is an electrical connection between said second battery and said first battery, by way of said energy router.

12. A hybrid solar power generator according to claim 3, wherein said main energy switch is capable of directing electrical energy from said first battery bank to said second battery bank.

13. A method of collecting and storing energy comprising the steps:
   a) providing a hybrid solar power generator having: a photovoltaic cell for converting light energy to electrical energy; a first battery electrically connected to receive and store electrical energy from said photovoltaic cell; a main energy switch electrically connected to said first battery, said main energy switch capable of disconnecting said photovoltaic cell when said hybrid solar power generator is at maximum capacity; an air compressor for converting electrical energy from said first battery to mechanical energy, said air compressor electrically connected to said main energy switch; a compressed air storage tank connected to said air compressor for storing the mechanical energy produced by said air compressor as potential energy in the form of compressed air; a first control sensor for determining if said compressed air storage tank is filled to capacity and deactivating said air compressor to prevent overfilling said compressed air storage tank; an air turbine connected to said compressed air storage tank for converting the potential energy stored as compressed air to mechanical energy and electrical energy; a second control sensor connected to said air turbine for selectively sending electrical energy to a second battery or to an electrical outlet; the second battery electrically connected to said second control sensor for storing electrical energy; the electrical output electrically connected to said second control sensor for sending electrical energy out of the system for use; an energy router for directing electrical energy from said second battery; and an electrical return for transmitting electrical energy from said second battery according to direction from said energy router; and b) exposing to said photovoltaic cell to light.

14. A method of collecting and storing energy according to claim 13, wherein said photovoltaic cell is exposed to sunlight.

15. A method of collecting and storing energy according to claim 14, wherein said photovoltaic cell is one of a plurality of photovoltaic cells connected within a photovoltaic panel.

16. A method of collecting and storing energy according to claim 15, wherein said photovoltaic panel is one of a plurality of photovoltaic panels connected within a solar array.

17. A method of collecting and storing energy according to claim 16, wherein said first battery is one of a plurality of batteries connected within a first battery bank.

18. A method of collecting and storing energy according to claim 17, wherein said second battery is one of a plurality of batteries connected within a second battery bank.

19. A method of collecting and storing energy according to claim 18, wherein said compressed air storage tank is one of a plurality of interconnected compressed air storage tanks.

20. A method of collecting and storing energy according to claim 19, wherein said electrical return is an electrical connection between said second battery bank and said first battery bank, by way of said energy router.

21. A method of collecting and storing energy according to claim 20, wherein said main energy switch is capable of directing electrical energy from said first battery bank to said second battery bank.

* * * * *